(12) United States Patent
Walton et al.

(10) Patent No.: US 8,498,215 B2
(45) Date of Patent: Jul. 30, 2013

(54) OPEN-LOOP RATE CONTROL FOR A TDD COMMUNICATION SYSTEM

(75) Inventors: Jay Rodney Walton, Carlisle, MA (US); Shravan K. Surineni, Marlborough, MA (US); Arnaud Maylan, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1168 days.

(21) Appl. No.: 11/175,787

(22) Filed: Jul. 5, 2005

(65) Prior Publication Data

US 2006/0104340 A1    May 18, 2006

Related U.S. Application Data

(60) Provisional application No. 60/628,785, filed on Nov. 16, 2004, provisional application No. 60/663,419, filed on Mar. 17, 2005.

(51) Int. Cl.
*H04J 1/16* (2006.01)
(52) U.S. Cl.
USPC .......................... 370/252; 375/296; 375/316
(58) Field of Classification Search
USPC .............. 370/349, 252, 276, 277, 279, 329, 370/332, 333, 341, 389; 455/513, 69, 67.13; 375/259, 260, 316, 296
See application file for complete search history.

(56) References Cited

U.S. PATENT DOCUMENTS

| 6,167,259 | A  |   | 12/2000 | Shah |
|-----------|----|---|---------|------|
| 7,020,110 | B2 |   | 3/2006  | Walton et al. |
| 7,164,649 | B2 |   | 1/2007  | Walton et al. |
| 7,187,646 | B2 | * | 3/2007  | Schramm ...................... 370/206 |
| 7,324,429 | B2 |   | 1/2008  | Walton et al. |
| 7,499,486 | B2 | * | 3/2009  | Boer et al. .................... 375/219 |

(Continued)

FOREIGN PATENT DOCUMENTS

| EP | 0 868 034 A2 | 9/1998 |
| GB | 2 350 735 A  | 12/2000 |

(Continued)

OTHER PUBLICATIONS

International Search Report—PCT/US05/041556—International Search Authority, European Patent Office, Jul. 14, 2006.

(Continued)

*Primary Examiner* — Dady Chery
(74) *Attorney, Agent, or Firm* — QUALCOMM Patent Group; James Hunt Yancey, Jr.

(57) ABSTRACT

Techniques for performing open-loop rate control in a TDD communication system are described. The channel quality of a first link is estimated based on a transmission received via the first link. The channel quality of a second link is estimated based on the estimated channel quality of the first link and an asymmetric parameter. At least one rate for a data transmission via the second link is selected based on the estimated channel quality of the second link. The estimated channel quality for each link may be given by a set of SNR estimates for a set of transmission channels on that link. The asymmetric parameter may be determined based on (1) the capabilities (e.g., transmit power, receiver noise figure, and number of antennas) of the transmitting and receiving stations or (2) received SNRs for the first and second links.

80 Claims, 3 Drawing Sheets

U.S. PATENT DOCUMENTS

| | | |
|---|---|---|
| 8,320,301 B2 | 11/2012 | Walton et al. |
| 2001/0048675 A1* | 12/2001 | Nafie et al. ............... 370/349 |
| 2003/0002450 A1* | 1/2003 | Jalali et al. ............... 370/294 |
| 2004/0042439 A1 | 3/2004 | Menon et al. |
| 2004/0120411 A1* | 6/2004 | Walton et al. ............... 375/260 |
| 2005/0249159 A1* | 11/2005 | Abraham et al. ............ 370/329 |

FOREIGN PATENT DOCUMENTS

| | | |
|---|---|---|
| GB | 2350753 | 12/2000 |
| JP | 2002514033 A | 5/2002 |
| KR | 20040050813 | 6/2004 |
| WO | WO03001761 A1 | 1/2003 |

OTHER PUBLICATIONS

Written Opinion—PCT/US05/041556—International Search Authority, European Patent Office, Jul. 14, 2006.

International Preliminary Report on Patentability—PCT/US05/041556—International Bureau of WIPO, Geneva Switzerland—May 22, 2007.

European Search Report—EP10175807—Search Authority—The Hague—Dec. 4, 2012.

Taiwan Search Report—TW094140262—TIPO—Nov. 22, 2011.

* cited by examiner

OPEN-LOOP RATE CONTROL FOR A TDD COMMUNICATION SYSTEM

CLAIM OF PRIORITY UNDER 35 U.S.C. §119

The present Application for Patent claims priority to Provisional Application Ser. No. 60/628,785, entitled "Open-Loop Rate Control for a TDD Communication System," filed Nov. 16, 2004, and Provisional Application Ser. No. 60/663,419, entitled "Open-Loop Rate Control for a TDD Communication System," filed Mar. 17, 2005, both assigned to the assignee hereof, and expressly incorporated herein by reference.

BACKGROUND

I. Field

The present disclosure relates generally to communication, and more specifically to rate control for a communication system.

II. Background

In a wireless communication system, a transmitting station processes traffic data for one or more data streams, generates one or more modulated signals, and transmits the modulated signal(s) via a wireless channel to a receiving station. The modulated signal(s) may experience various deleterious channel conditions such as, e.g., fading, multipath, and interference effects. The receiving station receives the modulated signal(s) and processes one or more received signals to recover the traffic data.

Rate control refers to the process for controlling the rate for each data stream sent by the transmitting station to the receiving station. A "rate" may be associated with a particular data rate, a particular coding scheme or code rate, a particular modulation scheme, and so on to use for a data stream. Rate control attempts to select a rate that is as high as possible while meeting a target packet error rate (PER) for each data stream based on the channel conditions such that the data stream can be reliably received.

Rate control is often performed in a closed-loop manner. For closed-loop rate control, the transmitting station typically transmits a pilot that is used by the receiving station to estimate the channel quality, which may be quantified by a signal-to-noise-and-interference ratio (SNR). The receiving station then selects one or more rates based on the estimated channel quality and sends the selected rate(s) back to the transmitting station. The transmitting station processes the traffic data based on the selected rate(s).

Closed-loop rate control is generally effective but may not always be available. Furthermore, there are some disadvantages with closed-loop rate control. First, the transmitting station expends system resources to transmit the pilot to the receiving station, and the receiving station expends system resources to send back the selected rate(s). Second, additional delays are typically incurred for the transmitting station to transmit the pilot and for the receiving station to send back the selected rate(s).

There is therefore a need in the art for techniques to perform rate control when closed-loop rate control is not available or when good performance using less system resources, e.g. transmission overhead to communicate channel quality, and with less delay is desired.

SUMMARY

Techniques for performing open-loop rate control in a time division duplexed (TDD) communication system are described herein. According to an embodiment of the disclosure, an apparatus is described which includes a processor and a controller. The processor estimates the channel quality of a first communication link based on a transmission (e.g., a pilot transmission) received via the first link. The controller estimates the channel quality of a second communication link based on the estimated channel quality of the first link and an asymmetric parameter indicative of a difference in the channel qualities of the first and second links.

According to another embodiment, an apparatus is described which includes a processor and a controller. The processor derives a first set of SNR estimates for a first set of transmission channels on a first link based on a transmission received via the first link. The controller derives a second set of SNR estimates for a second set of transmission channels on a second link based on the first set of SNR estimates and an asymmetric parameter. The controller further selects a set of rates for the second set of transmission channels based on the second set of SNR estimates.

According to yet another embodiment, an apparatus is described which includes a processor and a controller. The processor derives at least one SNR estimate for a first link based on a transmission received via the first link. The controller derives at least one SNR estimate for a second link based on the at least one SNR estimate for the first link. The controller further selects at least one rate for at least one data stream based on the at least one SNR estimate for the second link and adjusts the transmission of the at least one data stream based on feedback received for packets in the at least one data stream.

According to yet another embodiment, an apparatus is described which includes a controller and first and second processors. The first processor determines received SNRs for a first set of subbands of a first transmission channel on a first link based on a pilot transmission received via the first link. The controller selects at least one subband among a second set of subbands of a second transmission channel on a second link based on the received SNRs for the first transmission channel. The second processor processes data for transmission on the at least one subband of the second transmission channel.

Various other aspects and embodiments of the disclosure are described in further detail below.

DETAILED DESCRIPTION

Figure 1:
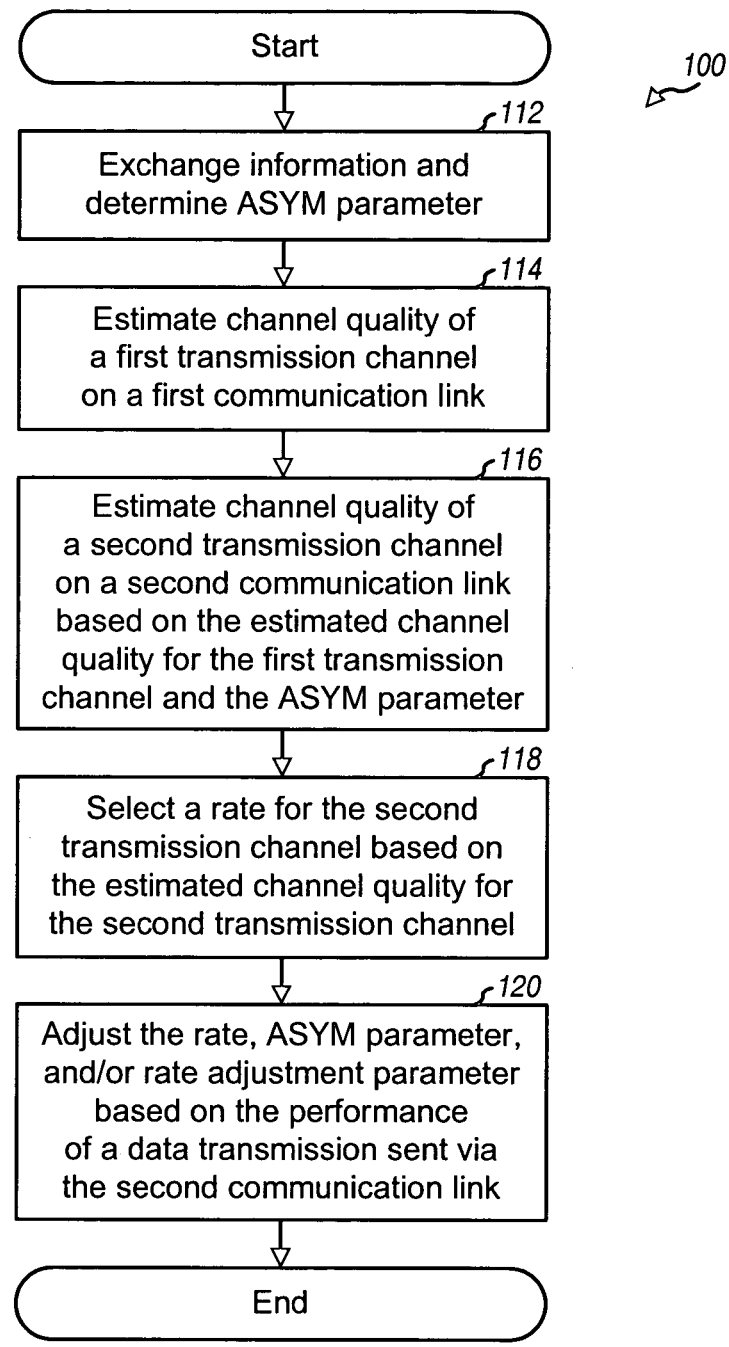
FIG. 1 shows a process performed by a transmitting station for open-loop rate control according to one or more embodiments.

The word "exemplary" is used herein to mean "serving as an example, instance, or illustration." Any embodiment described herein as "exemplary" is not necessarily to be construed as preferred or advantageous over other embodiments.

The open-loop rate control techniques described herein may be used for a single-input single-output (SISO) system, a single-input multiple-output (SIMO) system, a multiple-input single-output (MISO) system, and a multiple-input multiple-output (MIMO) system. A MIMO system employs multiple (T) transmit antennas at a transmitting station and multiple (R) receive antennas at a receiving station for data transmission. A MIMO channel formed by the T transmit antennas and the R receive antennas may be decomposed into S spatial channels, where $S \leq \min\{T, R\}$. Much of the following description is for a MIMO system.

The open-loop rate control techniques may also be used for single-carrier and multi-carrier systems. Multiple carriers may be obtained with orthogonal frequency division multiplexing (OFDM) or some other multi-carrier modulation techniques. OFDM partitions the overall system bandwidth into multiple (K) orthogonal frequency subbands, which are also called tones, subcarriers, bins, or frequency channels. With OFDM, each subband is associated with a respective subcarrier that may be modulated with data. For a MIMO system that utilizes OFDM, which is called a MIMO-OFDM system, S spatial channels are available for each of the K subbands. S wideband spatial channels may be formed with the spatial channels of the K subbands.

For clarity, the following description assumes that one data stream is sent on each transmission channel. A transmission channel may be a spatial channel in a MIMO system, an orthogonal spatial channel (or eigenmode) in a MIMO system that transmits on eigenmodes, a wideband spatial channel in a MIMO-OFDM system, a wideband eigenmode in a MIMO-OFDM system that transmits on eigenmodes, and so on. A transmission channel may also be called a parallel channel, a data channel, a traffic channel, a physical channel, or some other terminology.

For a calibrated TDD MIMO system, the responses of the wireless channel between two stations may be assumed to be reciprocal of one another. Thus, if matrix H represents the channel response from station A to station B, then a reciprocal channel implies that the channel response from station B to station A is given by $H^T$, where $H^T$ denotes the transpose of H. For a reciprocal channel, changes in bulk path loss, shadowing, multipath, fading, and so on may be assumed to be identical for the two links of the wireless channel. This reciprocity may be exploited for open-loop rate control.

The link from station A to station B may be denoted as link (A,B), and the link from station B to station A may be denoted as link (B,A). For station A, link (A,B) is the transmit link, and link (B,A) is the receive link. For station B, link (B,A) is the transmit link, and link (A,B) is the receive link. Link (A,B) and link (B,A) are considered to be symmetric if the SNR observed at station A for a transmission from station B is the same as the SNR observed at station B for a transmission from station A, assuming that the channel conditions have not changed over the time interval of interest. Symmetric links may be achieved for two stations A and B, e.g., if the characteristics of the transmitter and receiver units are the same for these two stations In practice, symmetric links may be difficult to achieve due to various factors such as manufacturing variability, component tolerance and so on. Furthermore, different stations may be manufactured with different capabilities, e.g., different transmit power levels, receiver noise figures, array dimensions, and so on. As a result, the links for stations A and B may not be symmetric, as illustrated below.

Table 1 shows exemplary capabilities for stations A and B.

TABLE 1

| | Transmit power | Receiver Noise Figure | Number of Receive Antennas |
|---|---|---|---|
| Station A | 17 dBm | 6 dB | 4 |
| Station B | 14 dBm | 10 dB | 2 |

For the example shown in Table 1, the received signal level (RSL) observed at station B when station A transmits at full power on a lossless channel may be computed as:

$$RSL(A \rightarrow B) = 17\ dBm - 10\ dB + 10\log_{10}(2) = 10\ dBm. \quad \text{Eq (1)}$$

The RSL observed at station A when station B transmits at full power on a lossless channel may be computed as:

$$RSL(B \rightarrow A) = 14\ dBm - 6\ dB + 10\log_{10}(4) = 14\ dBm. \quad \text{Eq (2)}$$

An asymmetric parameter ASYM(t,r) may be defined as the difference between (1) the SNR observed at station r when station t transmits at a known power level on a known channel and (2) the SNR observed at station t when station r transmits. For the example described above, the asymmetric parameters for stations A and B may be computed as:

$$ASYM(A,B) = RSL(A \rightarrow B) - RSL(B \rightarrow A) = -4\ dB, \text{ and} \quad \text{Eq (3)}$$

$$ASYM(B,A) = RSL(B \rightarrow A) - RSL(A \rightarrow B) = -ASYM(A,B) = 4\ dB. \quad \text{Eq (4)}$$

When the links are symmetric, the asymmetric parameters may be given as:

$$ASYM(B,A) = ASYM(A,B) = 0\ dBm. \quad \text{Eq (5)}$$

When the links are asymmetric, as is the case for the example shown in Table 1, the asymmetric parameters are non-zero and determined by the difference in the SNRs observed by the two stations for the transmissions from the other station. A positive value for the ASYM(t,r) parameter denotes that the SNR observed by station r from station t is higher than the SNR observed by station t from station r. Conversely, a negative value for the ASYM(t,r) parameter denotes that the SNR observed by station r from station t is lower than the SNR observed by station t from station r.

If the asymmetric parameters are known, then each station may directly infer from its receiver the rates that it may use to transmit data to the other station. For example, if station A transmits pilot and/or data to station B, then station B may estimate the SNR for each transmission channel on link (A,B) based on the pilot and/or data received from station A. Station B may then estimate the SNR for each transmission channel on link (B,A) as follows:

$$\hat{\gamma}_m(B,A) = \gamma_m(A,B) - ASYM(A,B), \quad \text{Eq (6)}$$

where $\gamma_m(A,B)$ is an SNR measurement for transmission channel m on link (A,B); and
$\hat{\gamma}_m(B,A)$ is an SNR estimate for transmission channel m on link (B,A).

Station B may derive SNR estimates for the transmission channels on link (A,B) based on the received pilot and/or data, as described below. Station B may then derive SNR estimates for the transmission channels on link (B,A) based on the SNR estimates for link (A,B) and the ASYM (A,B) parameter, as shown in equation (6). Station B may then use the SNR estimates for link (B,A) to select suitable rates for the data streams sent via the transmission channels on link (B,A) to station A.

Similarly, if station B transmits pilot and/or data to station A, then station A may derive an SNR estimate for each transmission channel on link (B,A) based on the pilot and/or data received from station B. Station A may then derive an SNR estimate for each transmission channel on link (A,B) as follows:

$$\hat{\gamma}_m(A,B) = \gamma_m(B,A) - ASYM(B,A), \quad \text{Eq (7)}$$

where $\gamma_m(B,A)$ is an SNR measurement for transmission channel m on link (B,A); and
$\hat{\gamma}_m(A,B)$ is an SNR estimate for transmission channel m on link (A,B).

Station A may use $\hat{\gamma}_m(A,B)$ to select a suitable rate for each transmission channel m on link (A,B).

The ASYM parameter may be determined for each link in various manners. In an embodiment, stations A and B exchange their capabilities (e.g., transmit power, noise figure, and number of antennas) via signaling. Each station may then compute the ASYM parameter for its receive link based on the capabilities of both stations. In another embodiment, each station measures the received SNR for its receive link based on a pilot transmitted at a known power level by the other station and sends the received SNR to the other station. Each station may then compute the ASYM parameter based on the received SNRs for the two links and the power levels of the pilots sent on the two links. In yet another embodiment, the ASYM parameter is determined based on receiver feedback without any initial message exchange. The ASYM parameter may be initialized as ASYM(A,B)=0. When station B transmits to station A, station A computes the SNR estimate as $\hat{\gamma}_m(B,A) = \gamma_m(A,B) - ASYM(A,B)$, where ASYM(A,B) is zero initially. Feedback from station A is used to adjust the ASYM parameter in order to achieve the desired packet error rate. The feedback from station A may be ACKs/NAKs provided by the MAC layer or other type of feedback (e.g., real time control protocol (RTCP) frames).

In many cases, the ASYM parameter for each link is a fixed or static value. For these cases, the ASYM parameter may be determined once for each link and used for all subsequent data transmission sent via that link. However, there may be situations in which the ASYM parameter varies. For example, the dynamic range of the stations may be different, and nonlinearities may change the value of the ASYM parameter depending on the actual received signal levels. Also, the ambient temperature can affect the receiver noise figure. As another example, different phase noise characteristics in the transmitter and receive chains may also impact the ASYM parameter as a function of the received SNR. In these cases, changes and/or errors in the ASYM parameter may be accounted for by an outer loop, as described below.

FIG. 1 shows a process 100 performed by the transmitting station for open-loop rate control according to one or more embodiments. Initially, information may be exchanged with the receiving station to determine the ASYM parameter (block 112). Block 112 may also be omitted if the ASYM parameter is determined without any initial message exchange, as described above. Thereafter, the channel quality of a first transmission channel on a first communication link is estimated based on pilot and/or data transmission received via the first communication link (block 114). The channel quality of a second transmission channel on a second communication link is then estimated based on the estimated channel quality for the first transmission channel and the ASYM parameter (block 116). A rate is selected for the second transmission channel based on the estimated channel quality for the second transmission channel (block 118). The rate, ASYM parameter, and/or rate adjustment parameter may be adjusted based on the performance of a data transmission sent via the second communication link (block 120).

Figure 2:
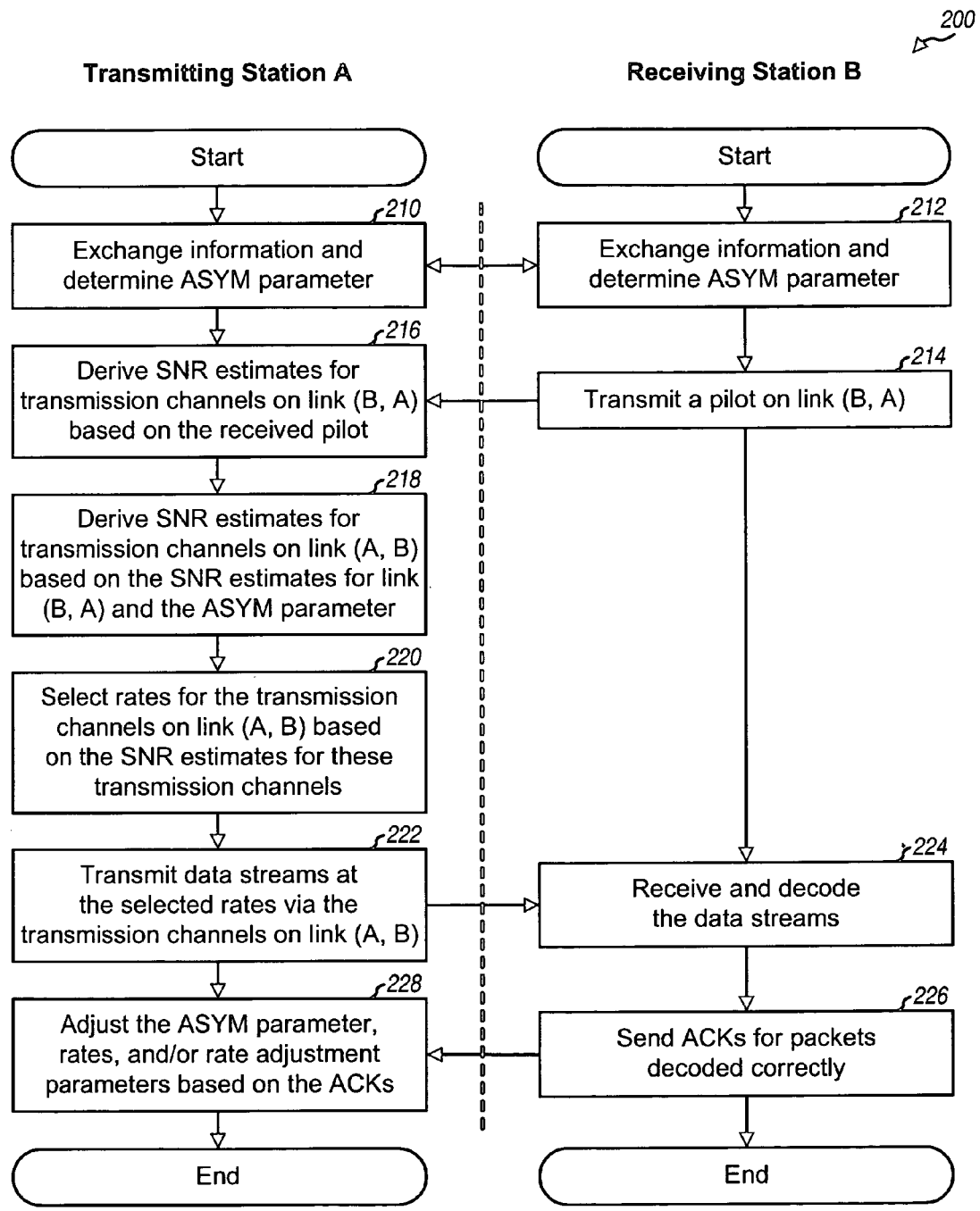
FIG. 2 shows a process for performing open-loop rate control in a TDD system according to one or more embodiments.

FIG. 2 shows a process 200 for performing open-loop rate control in a TDD system according to one or more embodiments. Initially, stations A and B exchange pertinent information so that each station can determine the ASYM parameter for its receive link (blocks 210 and 212). Blocks 210 and 212 may be performed once (e.g., during system access or registration), periodically, or whenever needed.

Thereafter, for data transmission from station A to station B, station B transmits a pilot on link (B,A) (block 214). Station A receives the pilot and derives SNR estimates for the transmission channels on link (B,A), as described below (block 216). Station A then derives SNR estimates for the transmission channels on link (A,B) based on the SNR estimates for link (B,A) and the ASYM parameter (block 218). Station A selects rates for the transmission channels on link (A,B) based on the SNR estimates for these transmission channels (block 220). Station A then transmits data streams at the selected rates via the transmission channels on link (A,B) (block 222).

Station B receives the data streams from station A and decodes the packets sent in these data streams (block 224). Station B may send acknowledgments (ACKs) for packets decoded correctly (or good packets) and/or negative acknowledgments (NAKs) for packets decoded in error (or erased packets) (block 226). Station A receives the ACK/NAK feedback and adjusts the ASYM parameter, rates, and/or rate adjustment parameters based on the ACK/NAK feedback (block 228). Station A adjusts the transmission of the data streams based on the adjustments determined in block 228.

Figure 3:
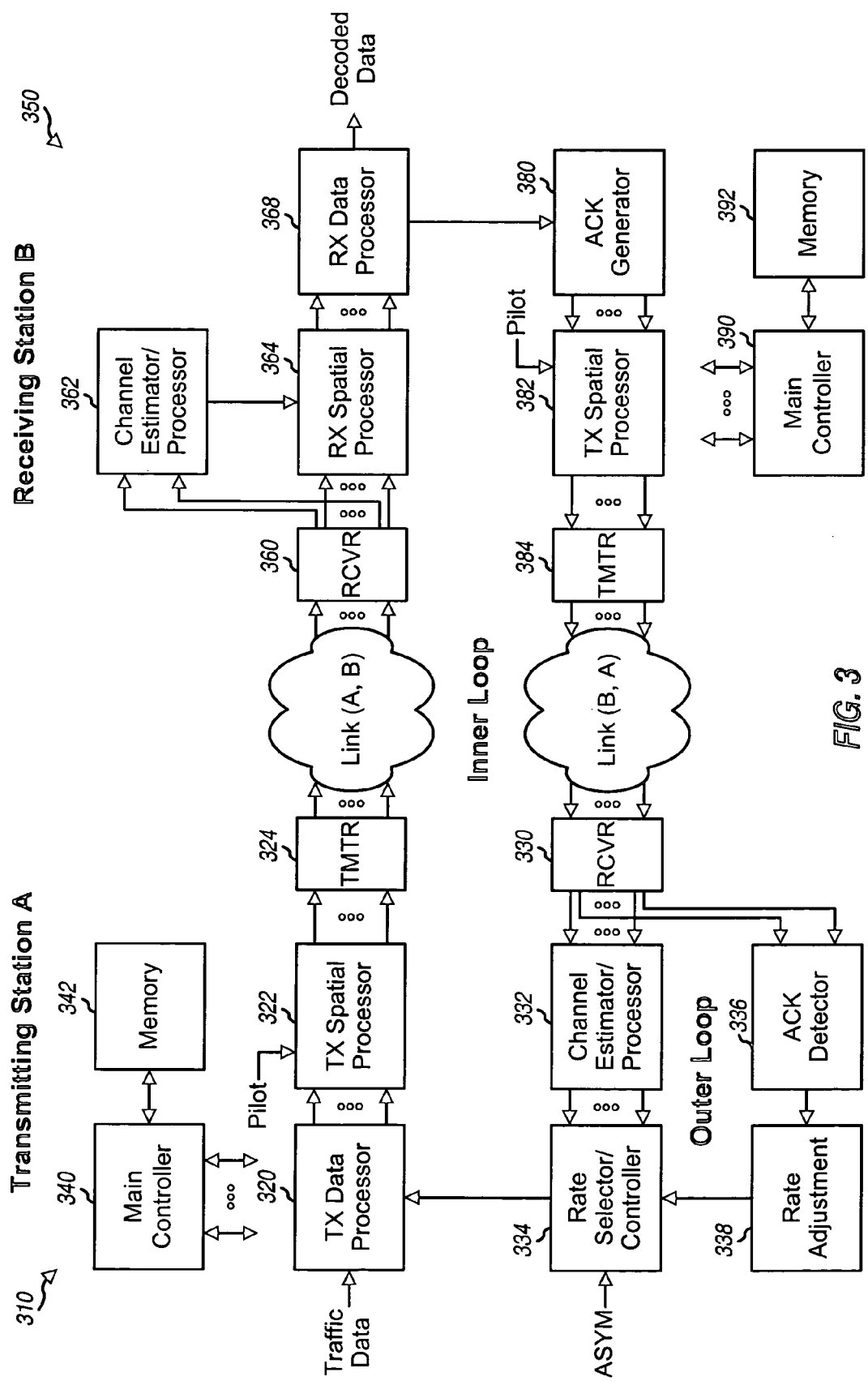
FIG. 3 shows a block diagram of a transmitting station and a receiving station according to one or more embodiments.

FIG. 3 shows a block diagram of station A 310 and station B 350 according to one or more embodiments. For downlink transmission, station A is an access point, station B is a user terminal, link (A,B) is the downlink or forward link, and link (B,A) is the uplink or reverse link. For uplink transmission, station A is a user terminal, station B is an access point, link (A,B) is the uplink, and link (B,A) is the downlink. For peer-to-peer transmission, stations A and B may be two user terminals.

At station A, a rate selector/controller 334 selects a rate for each of M data streams to be sent to station B, where M≧1. The M data streams may be sent at the same or different rates, depending on the manner in which the data streams are transmitted and/or the channel conditions. A transmit (TX) data processor 320 receives traffic data, processes (e.g., encodes, interleaves, and symbol maps) the traffic data based on the M selected rates, and generates M streams of data symbols. As used herein, a data symbol is a modulation symbol for traffic data, a pilot symbol is a modulation symbol for pilot (which is data that is known a priori by both the transmitting and receiving stations), a modulation symbol is a complex value for a point in a signal constellation for a modulation scheme (e.g., M-PSK or M-QAM), and a symbol is a complex value. A TX spatial processor 322 multiplexes the M data symbol streams with pilot symbols, performs spatial processing on the data and pilot symbols if applicable and as described below, and provides T transmit symbol streams for T transmit antennas. A transmitter unit (TMTR) 324 processes the T transmit symbol streams (e.g., for OFDM) and generates T modulated signals, which are transmitted via link (A,B) to station B. Link (A,B) distorts the modulated signals with a channel response and further degrades the modulated signals with additive white Gaussian noise (AWGN) and possibly interference from other stations.

At station B, a receiver unit (RCVR) 360 receives the transmitted signals via R receive antennas and processes (e.g., conditions and digitizes) R received signals to generate R sample streams. Receiver unit 360 further processes the R sample streams (e.g., for OFDM), provides received pilot symbols to a channel estimator/processor 362, and provides received data symbols to a receive (RX) spatial processor 364. Channel estimator 362 estimates the MIMO channel response for link (A,B) and provides channel estimates to RX spatial processor 364. RX spatial processor 364 performs receiver spatial processing on the received data symbols based on the channel estimates and provides M detected data symbol streams, which are estimates of the M data symbol streams sent by station A. An RX data processor 368 processes (e.g., symbol demaps, deinterleaves, and decodes) the M detected data symbol streams based on the M selected rates and provides decoded data, which is an estimate of the traffic data sent by station A. RX data processor 368 further provides the status of each received packet (e.g., erased or good).

Controllers 340 and 390 control the operation of various processing units at stations A and B, respectively. Memory units 342 and 392 store data and program codes used by controllers 340 and 390, respectively.

The open-loop rate control techniques do not require receiving station B to send explicit feedback information to transmitting station A specifically for rate selection. The term "open-loop" in the context of open-loop rate control refers to the absence of such explicit feedback information, which may include, for example, a rate per data stream, an SNR per data stream, an SNR per antenna, and so on. In contrast, a closed-loop rate control scheme typically requires the receiving station to determine feedback information based on the channel conditions observed at the receiving station and to send this information back to the transmitting station, which then uses the information for rate selection for data transmission to the receiving station.

The open-loop rate control techniques utilize information that is available for normal system operation. For example, the open-loop rate control techniques may utilize (1) received SNRs obtained by transmitting station A based on pilot and/or data received from receiving station B, (2) ACKs and/or NAKs received from station B for packets sent by station A, and (3) possibly other information. A medium access control (MAC) layer that resides above a physical layer at station B may send an ACK for each packet decoded correctly and either a NAK or no ACK for each packet decoded in error. Station A may use the ACK/NAK feedback to retransmit packets decoded in error. The ACK/NAK feedback is not explicit feedback information in terms of recommending which rate(s) to use for data transmission or how much to increase or decrease the selected rate(s). For clarity, some parts of the following description assume that ACKs are sent back for correctly decoded packets and no ACKs are sent back (or ACKs are absence) for packets decoded in error.

FIG. 3 also shows an embodiment of an open-loop rate control mechanism, which includes an inner loop and an outer loop. The inner loop estimates the SNRs observed at receiving station B based on pilot and/or data received from station B and the ASYM parameter and selects a suitable rate for each data stream sent to station B. The outer loop adjusts the operation of the inner loop to achieve the desired level of performance, which may be quantified by a target packet error rate, e.g., 1% PER.

For the inner loop, station B may transmit a pilot via link (B,A) to station A. At station B, the pilot is processed by a TX spatial processor 382 and sent from a transmitter unit 384. At station A, the pilot is received by a receiver unit 330 and provided to a channel estimator/processor 332. Channel estimator 332 determines the received SNRs for link (B,A) based on the received pilot and derives SNR estimates for link (B,A) based on the received SNRs. Rate selector 334 derives SNR estimates for link (A,B) based on the SNR estimates for link (B,A) and the ASYM parameter and further selects the rates for data transmission on link (A,B).

For the outer loop, station B may send ACK feedback to station A for packets correctly received from station A and/or NAK feedback for incorrectly received packets or packets that are expected but not received. At station B, an ACK generator 380 generates ACKs/NAKs based on the packet status provided by RX data processor 368. Station B further processes and transmits the ACKs/NAKs to station A. At station A, an ACK/NAK detector 336 detects the transmitted ACKs/NAKs and provides the detected ACKs/NAKs to a rate adjustment unit 338. Unit 338 adjusts the ASYM parameter, rates, and/or one or more rate adjustment parameters based on the detected ACKs/NAKs and provides the adjustments to rate selector 334. The rate adjustment parameters may include, for example, an SNR back-off factor, an adjustment to the ASYM parameter, an indication to reduce the number of data streams, an indication to reduce the rates for the data streams, and so on, as described below. Rate selector 334 uses the adjustments along with the SNR estimates and the ASYM parameter to select M rates for the M data streams sent via link (A,B).

Each station may maintain an inner loop and an outer loop for data transmission on its forward link to another station. The inner loop may be driven by the SNR estimates, and the outer loop may be driven by ACK/NAKs and/or other information. Each station may derive and use the SNR estimates to decide what rates to use for data transmission to the other station. The accuracy of the SNR estimates for the transmit link is dependent on the accuracy of the ASYM parameter. However, even in the absence of a good estimate for the ASYM parameter, the outer loop can drive the rate selection by the transmitting station to the right point so that the proper rates are used for data transmission.

The ability to accurately estimate the SNRs for one link based on a transmission received via the other link allows for selection of rates that are closer to the highest rates supported by the link. This allows each data stream to be sent with a smaller SNR margin, which is the difference between the SNR observed at the receiving station for that data stream and the SNR required for the rate selected for the data stream. Smaller SNR margins for the data streams result in better utilization of the link capacity. Accurate SNR estimation also avoids excessive packet errors. Furthermore, the ability to use an SNR measurement for the reverse link to transmit data on the forward link permits fast channel tracking. There is no need to transmit on link (A,B), then wait for the rate feedback on link (B,A), then finally transmit data at the proper rate on link (A, B). Instead, the SNR measurement for link (B,A) may be used to transmit data on link (A,B), and the turn around time may be quite short.

Open-loop rate control may be implemented in various manners and may be used for various transmission schemes. Exemplary designs for the inner and outer loops are described below.

1. Transmission Modes

A MIMO system may support multiple transmission modes for improved performance and greater flexibility. Table 2 lists some exemplary transmission modes.

TABLE 2

| Transmission Mode | Description |
| --- | --- |
| Steered mode | M data streams are transmitted on M orthogonal spatial channels (or eigenmodes) of a MIMO channel, where $1 \leq M \leq S$. |
| Unsteered mode | M data streams are transmitted on M spatial channels, e.g., from M transmit antennas. |
| Spatial spreading mode | M data streams are transmitted with spatial spreading to achieve similar performance for all data streams. |

Each transmission mode has different capabilities and requirements. The steered mode (which is also called eigensteering) transmits data on the eigenmodes of a MIMO channel. The steered mode typically provides better performance but requires spatial processing at both the transmitting and receiving stations. The unsteered mode requires no spatial processing at the transmitting station, e.g., one data stream may be sent from each transmit antenna. Performance for the unsteered mode is typically not as good as the steered mode. The spatial spreading mode transmits M data streams with different steering matrices so that these streams observe an ensemble of effective channels and achieve similar performance. A suitable transmission mode may be selected for use depending on the availability of channel state information (CSI), the capabilities of the transmitting and receiving stations, and so on.

For the steered mode, data is transmitted on up to S eigenmodes of the MIMO channel formed by T transmit antennas and R receive antennas. The MIMO channel may be characterized by an R×T channel response matrix H, which may be diagonalized to obtain the S eigenmodes of H. This diagonalization may be achieved by performing either singular value decomposition of H or eigenvalue decomposition of a correlation matrix of H, which is $R=H^H \cdot H$, where $H^H$ denotes the conjugate transpose of H. The eigenvalue decomposition of R may be expressed as:

$$R = H^H \cdot H = E \cdot \Lambda \cdot E^H, \quad \text{Eq (8)}$$

where E is a T×T unitary matrix of eigenvectors of R; and
Λ is a T×T diagonal matrix of eigenvalues of R.
A unitary matrix E is characterized by the property $E^H \cdot E = I$, where I is the identity matrix. The columns of a unitary matrix are orthogonal to one another, and each column has unit power. The eigenvectors in E may be used for (1) spatial processing by the transmitting station to transmit data on the S eigenmodes of H and (2) receiver spatial processing by the receiving station to recover the data transmitted on the S eigenmodes. The diagonal matrix Λ contains non-negative real values along the diagonal and zeros elsewhere. These diagonal entries are referred to as eigenvalues of H and represent the power gains for the S eigenmodes of H.

For a MIMO-OFDM system, a channel response matrix H(k) may be obtained for each subband k and decomposed to obtain the eigenvectors E(k) and eigenvalues Λ(k) for that subband. The S eigenvalues for each subband k may be ordered from largest to smallest, and the S eigenmodes of H(k) would then be ordered from highest SNR to lowest SNR. Wideband eigenmode m, for m=1, ..., S, may be formed with eigenmode m for each of the K subbands. The principal wideband eigenmode (with m=1) is associated with the largest eigenvalue for each of the K subbands, the second wideband eigenmode (with m=2) is associated with the second largest eigenvalue for each of the K subbands, and so on.

Table 3 summarizes the spatial processing at the transmitting station and the receiving station for the three transmission modes given in Table 2. The same processing is performed for each subband, and subband index k is not shown in Table 3.

TABLE 3

| | Steered mode | Unsteered mode | Spatial spreading |
| --- | --- | --- | --- |
| Transmitter | $x_{es} = E \cdot s$ | $x_{us} = s$ | $x_{ss} = V \cdot s$ |
| Effective Channel | $H_{es} = H \cdot E$ | $H_{us} = H$ | $H_{ss} = H \cdot V$ |
| Received Symbols | | $r_x = H \cdot x_x + n = H_x \cdot s + n$ | |
| Receiver full-CSI/CCMI | $M_{es} = \Lambda^{-1} \cdot E^H \cdot H^H$ $\hat{s}_{es} = M_{es} \cdot r_{es}$ | $M_{ccmi}^{us} = [H^H \cdot H]^{-1} \cdot H^H$ $\hat{s}_{ccmi}^{us} = M_{ccmi}^{us} \cdot r_{us}$ | $M_{ccmi}^{ss} = V^H \cdot M_{ccmi}^{us}$ $\hat{s}_{ccmi}^{ss} = M_{ccmi}^{ss} \cdot r_{ss}$ |
| Receiver MMSE | | $M_{mmse}^x = [H_x^H \cdot H_x + \sigma_{noise}^2 \cdot I]^{-1} \cdot H_x^H$ $D_{mmse}^x = [\text{diag}[M_{mmse}^x \cdot H_x]]^{-1}$ $\hat{s}_{mmse}^x = D_{mmse}^x \cdot M_{mmse}^x \cdot r_x$ | |

In Table 3, the subscript "es" denotes the steered mode (or eigensteering), "us" denotes the unsteered mode, "ss" denotes the spatial spreading mode, and "x" may be "es", "us" or "ss". $\sigma_{noise}^2$ is the variance of the AWGN noise in the MIMO channel. s is a T×1 vector with M data symbols to be sent on one subband in one symbol period and T−M zeros. V is a T×T steering matrix used for spatial spreading. $x_x$ is a T×1 vector with T transmit symbols to be sent from the T transmit antennas on one subband in one symbol period for transmission mode x. $H_x$ is an R×T effective channel response matrix for transmission mode x. M is a T×R spatial filter matrix that may be derived using a full-CSI technique, a channel correlation matrix inversion (CCMI) technique, or a minimum mean square error (MMSE) technique. ŝ is a T×1 vector of detected data symbols and is an estimate of s. The MMSE and CCMI techniques may be used for all three transmission modes. The MMSE and CCMI spatial filter matrices may be derived in the same manner for all three transmission modes, albeit with different effective channel response matrices $H_{es}$, $H_{us}$, and $H_{ss}$.

Successive interference cancellation may also be used to recover the M data streams in M stages. Each stage l detects one data stream using one of the receiver spatial processing techniques shown in Table 3, decodes the detected data symbol stream, estimates the interference caused by the decoded data stream on the data streams not yet recovered, and cancels the estimated interference from the received symbol streams to obtain modified symbol streams for the next stage l+1. The next stage l+1 would then detect, decode, and cancel another data stream.

Rate selection and open-loop rate control for a data transmission from station A to station B in a TDD MIMO-OFDM system are described below.

2. Inner Loop

The inner loop selects the rates for the M data streams sent by station A to station B. The components of the inner loop include SNR estimation, power allocation, and rate selection.

A. SNR Estimation

The received SNR for each subband of each transmission channel on link (B,A) may be determined based on a pilot received via link (B,A) and the receiver spatial processing technique used by station A. The pilot may be a "clear" pilot sent without any spatial processing, a "steered" pilot sent on the eigenmodes with E, or a "spread" pilot sent on multiple spatial channels with V.

For the full-CSI technique for the steered mode, the received SNR for each subband k of each wideband eigenmode m, $\gamma_{es,m}(k)$, may be expressed as:

$$\gamma_{es,m}(k) = 10\log_{10}\left(\frac{P_m(k) \cdot \lambda_m(k)}{\sigma_{noise}^2}\right), \text{ for } m = 1, \ldots, S, \quad \text{Eq (9)}$$

where $P_m(k)$ is the transmit power used for subband k of wideband eigenmode m; and $\lambda_m$ is the m-th diagonal element of $\Lambda(k)$ for subband k.

For the MMSE technique for all three transmission modes, the received SNR for each subband k of each wideband spatial channel m, $\gamma_{mmse,m}(k)$, may be expressed as:

$$\gamma_{mmse,m}(k) = 10\log_{10}\left(\frac{q_m(k)}{1-q_m(k)}P_m(k)\right), \text{ for } m = 1, \ldots, S, \quad \text{Eq (10)}$$

where $q_m(k)$ is the m-th diagonal element of $M_{mmse}^x \cdot H_x$ for subband k.

For the CCMI technique for all three transmission modes, the received SNR for each subband k of each wideband spatial channel m, $\gamma_{ccmi,m}(k)$, may be expressed as:

$$\gamma_{ccmi,m}(k) = 10\log_{10}\left(\frac{P_m(k)}{r_m(k) \cdot \sigma_{noise}^2}\right), \text{ for } m = 1, \ldots, S, \quad \text{Eq (11)}$$

where $r_m(k)$ is the m-th diagonal element of $R_x^{-1} = [H_x^H \cdot H_x]^{-1}$ for subband k.

In equations (9), (10) and (11), $P_m(k)/\sigma_{noise}^2$ is the SNR prior to the receiver spatial processing and is in linear units. The quantities $\gamma_{es,m}(k)$, $\gamma_{mmse,m}(k)$, and $\gamma_{ccmi,m}(k)$ are the SNRs after the receiver spatial processing, are in units of decibels (dB), and are also referred to as the received SNRs.

For the spatial spreading mode, the S spatial channels achieve similar received SNRs because of the spatial spreading with different matrices V. Consequently, the same rate may be used for all data streams sent on these spatial channels. With spatial spreading, an average SNR for all spatial channels may be expressed as:

$$\gamma_{mmse}(k) = 10\log_{10}\left(\sum_{m=1}^{S}\frac{q_m(k)}{1-q_m(k)}P_m(k)\right), \text{ and} \quad \text{Eq (12)}$$

$$\gamma_{ccmi}(k) = 10\log_{10}\left(\sum_{m=1}^{S}\frac{P_m(k)}{r_m(k) \cdot \sigma_{noise}^2}\right). \quad \text{Eq (13)}$$

The SNR averaging may be performed in linear units, as shown in equations (12) and (13), or in dB units.

The received SNR of each data stream may also be determined based on the detected data symbols for that stream. For data-based SNR estimation, the receiving station performs spatial processing on the received data symbols with the spatial filter matrix for each subband to obtain the detected data symbols. Each detected data symbol is typically a multi-bit value (or a soft-decision) that is an estimate of a transmitted data symbol. The receiving station may convert the detected data symbols to hard decisions, determine the difference between the hard and soft decisions for each detected data symbol in each data stream, and compute an average error power for each data stream as the average of the magnitude squares of the difference between the hard and soft decisions for the data stream. The receiving station may then derive a data-based received SNR for each data stream based on the average error power for that data stream.

The pilot is typically transmitted such that pilot-based received SNRs may be obtained for all S spatial channels, even if data is transmitted on fewer than S spatial channels. Data-based received SNRs may be obtained for the M data streams that are actually transmitted. Both pilot-based and data-based received SNRs may be used to select the rates for data transmission. A discrepancy between the pilot-based and data-based received SNRs may be indicative of impairments at the transmitting station and/or receiving station. In this case, the smaller or the average of the two types of received SNRs may be used to select the rate for each data stream.

B. Power Allocation

The receive SNRs for each transmission channel (e.g., each wideband eigenmode or wideband spatial channel) may vary widely across the K total subbands. Improved performance may be achieved by using certain subbands for data transmission and/or allocating the available transmit power in different manners.

In an embodiment, only good subbands are used for data transmission and poor subbands are not used for data transmission. For this embodiment, the received SNR $\gamma_m(k)$ for each subband may be determined based on a nominal transmit power for the subband, e.g., with the total transmit power for the transmission channel distributed uniformly across the K total subbands. A subband may be deemed as (1) a good subband if its received SNR exceeds a low SNR threshold, $\gamma_m(k) > \gamma_{th\_low}$, or (2) a poor subband otherwise. The total transmit power for the transmission channel is distributed uniformly across the good subbands.

In another embodiment, only good subbands are used for data transmission, poor subbands are not used for data transmission, and the total transmit power for the transmission channel is distributed non-uniformly across the good subbands. For this embodiment, each subband may be deemed as a good subband or a poor subband. The total transmit power for the transmission channel is then distributed uniformly across the good subbands. The received SNR for each good subband is determined based on the transmit power allocated to that subband. If the received SNR exceeds a high SNR threshold, $\gamma_m(k) > \gamma_{th\_high}$, where $\gamma_{th\_high} > \gamma_{th\_low}$, then the subband is allocated sufficient transmit power to achieve the high SNR threshold, and the excess transmit power is collected. The total excess transmit power collected from all good subbands with received SNRs greater than $\gamma_{th\_high}$ is then redistributed (e.g., uniformly) across the other good subbands with received SNRs below $\gamma_{th\_high}$. The process may be repeated until all excess power is used up. This embodiment collects transmit powers from poor subbands and excess transmit powers from very good subbands and redistributes the collected transmit powers across the good subbands.

In yet another embodiment, channel inversion is performed so that all subbands achieve similar received SNRs. For this embodiment, the amount of transmit power allocated to each subband is inversely related to the received SNR for that subband. Subbands with lower received SNRs are allocated more transmit powers, and subbands with higher received SNRs are allocated less transmit powers. This embodiment may improve performance for certain coding schemes that prefer less variation in received SNRs across a packet.

In yet another embodiment, only good subbands are used for data transmission, poor subbands are not used for data transmission, and channel inversion is performed across the good subbands. For this embodiment, the good subbands may first be identified based on the SNR threshold $_{th\_low}$. The total transmit power for the transmission channel is then distributed non-uniformly across the good subbands such that these subbands achieve similar received SNRs.

The subbands may also be selected for data transmission in other manners. The total transmit power for each transmission channel may also be distributed across the selected subbands in other manners.

For the embodiments described above, the SNR thresholds $_{th\_low}$ and $_{th\_high}$ may be fixed values. Alternatively, these SNR thresholds may be a function of the rate used for the transmission channel and/or some other factors. For example, lower values may be used for the SNR thresholds for lower rates, and higher values may be used for the SNR thresholds for higher rates.

The power allocation described above can improve performance without requiring explicit feedback from the receiving station. The transmitting station can determine the received SNRs for the subbands of each transmission channel based on the pilot from the receiving station and can use these received SNRs to select subbands for data transmission and to distribute the total transmit power to the selected subbands. The receiving station may not need to be aware of the subband selection and the transmit power distribution by the transmitting station.

C. Rate Selection

The rate for each data stream may be selected as follows. The received SNR for each subband k used for each data stream m may be computed as described above and denoted as $\gamma_m(k)$. For a MIMO-OFDM system, the received SNRs for each data stream are typically frequency dependent and are further dependent on the transmission mode and the receiver spatial processing technique used for data transmission. In the following description, all SNR quantities are in units of dB.

The average SNR for each data stream m, $\gamma_{avg,m}$, may be computed as:

$$\gamma_{avg,m} = \frac{1}{K} \cdot \sum_{k=1}^{K} \gamma_m(k), \text{ for } m = 1, \ldots, M. \quad \text{Eq (14)}$$

The variance of the SNRs for each data stream m, $\sigma_{snr,m}^2$, may be computed as:

$$\sigma_{snr,m}^2 = \frac{1}{(K-1)} \cdot \sum_{k=1}^{K} (\gamma_m(k) - \gamma_{avg,m})^2, \text{ for } m = 1, \ldots, M. \quad \text{Eq (15)}$$

An SNR variability back-off factor for each data stream m, $\gamma_{os,m}$, which is used to account for variability in received SNRs across the K subbands, may be computed as:

$$\gamma_{os,m} = K_{os} \cdot \sigma_{snr,m}^2, \text{ for } m=1, \ldots, M \quad \text{Eq (16)}$$

where $K_{os}$ is a constant used to reduce the SNR estimate from the average SNR to reflect the fact that many error correction codes do not handle well a large variation in SNRs across a packet to be decoded. The factor $K_{os}$ may be selected based on the error correction code and/or the code rate used for data stream m. In general, the SNR variability back-off factor may be computed based on any function of average SNR and SNR variance, or $\gamma_{os,m} = F(\gamma_{avg,m}, \sigma_{snr,m}^2)$.

A MIMO back-off factor for each data stream m for the steered mode, $\gamma_{mimo,m}^{es}$, may be defined as:

$$\gamma_{mimo,m}^{es} = \frac{m \cdot \beta}{K_d}, \text{ for } m = 1, \ldots, M, \quad \text{Eq (17)}$$

where $\beta$ is a positive constant and $K_d$ is the diversity order for the data transmission. The factor $\beta$ reduces the SNR estimate to account for rate mismatches that may occur due to (1) noise in the link and SNR estimation process and (2) misalignment of the steering vectors used by the transmitting and receiving stations for the steered mode. The factor $\beta$ is typically a positive constant that is close to unity (1.0).

The diversity order $K_d$ for the steered mode may be given as:

$$K_d = R - M + 1. \quad \text{Eq (18)}$$

The diversity order $K_d$ accounts for the amount of spatial diversity achieved for the data transmission. The diversity order increases as more receive antennas are used for a given number of data streams. A higher diversity order typically corresponds to less variation in received SNRs for each data stream.

The stream index m in equation (17) accounts for the fact that different data streams may have different amounts of SNR variability for the steered mode. The principal wideband eigenmode has the highest average SNR and less SNR variability across time and frequency, and a smaller MIMO back-off factor (with m=1) may be used for this wideband eigenmode. The S-th wideband eigenmode has the lowest average SNR and more SNR variability across time and frequency, and a larger MIMO back-off factor (with m=S) may be used for this wideband eigenmode. The stream index m may also be omitted from equation (17).

A MIMO back-off factor for the unsteered mode and the spatial spreading mode may be defined as:

$$\gamma_{mimo,m}^{ss} = \gamma_{mimo,m}^{us} = \frac{\beta}{K_d(m)}, \text{ for } m = 1, \ldots, M, \quad \text{Eq (19)}$$

where $K_d(m)$ is the diversity order observed by data stream m, which is:

$$K_d(m) = \quad \text{Eq (20)}$$

$$\begin{cases} R - M + 1 & \text{without successive interference cancellation,} \\ R - M + m & \text{with successive interference cancellation.} \end{cases}$$

With successive interference cancellation, after estimating and canceling the interference due to data stream m, the diversity order for each subsequent data stream increases as if data stream m was not transmitted. For example, if R=4 and M=3, then data stream m=1 observes diversity order of two, data stream m=2 observes diversity order of three, and data stream m=3 observes diversity order of four.

The SNR estimate for each data stream may be computed as:

$$\gamma_{est,m} = \gamma_{avg,m} - \gamma_{os,m} - \gamma_{mimo,m} - \gamma_{outer,m}, \text{ for } m=1,\ldots,M, \quad \text{Eq (21)}$$

where $\gamma_{outer,m}$ is an outer loop back-off factor for data stream m;

$\gamma_{mimo,m}$ is a MIMO back-off factor for data stream m; and $\gamma_{est,m}$ is the SNR estimate for data stream m.

The MIMO back-off factor $\gamma_{mimo,m}$ may be determined as shown in equation (17) or (19) and may be used to account for various characteristics associated with MIMO transmission. In general, the various factors described above (e.g., $K_{os}$, $K_d$ and $\beta$) may be selected to maximize throughput and minimize packet error rate and may be determined based on computation simulation, empirical measurements, and so on. The SNR estimate may also be derived based on other factors. For example, a factor L may be used to account for variations in the length of the packets. A larger packet generally requires a higher SNR to achieve a given PER.

For open-loop rate control, transmitting station A may derive the SNR estimates for receive link (B,A) as described above. Station A may then derive the SNR estimates for transmit link (A,B) based on the SNR estimates for link (B,A) and the ASYM parameter, as shown in equation (6) or (7). Station A may use the SNR estimates for link (A,B) to select the rates to use for the data streams sent on link (A,B) to station B.

In an embodiment, the rate for each data stream is independently selected based on the SNR estimate for that data stream. The system may support a set of rates. Table 4 lists an exemplary set of 14 rates supported by the system. Each rate is associated with a specific spectral efficiency, a specific code rate, a specific modulation scheme, and a specific minimum SNR required to achieve 1% PER for a non-fading, AWGN channel. Spectral efficiency refers to data rate normalized by system bandwidth, and is given in units of bits per second per Hertz (bps/Hz). The code rate and modulation scheme for each rate in Table 4 are specific to the exemplary system design. For each non-null rate, the required SNR is obtained based on the specific system design (e.g., the code rate, interleaving scheme, and modulation scheme used for that rate) and for an AWGN channel. The required SNR may be obtained by computation, computer simulation, empirical measurements, and so on.

TABLE 4

| Rate Index | Spectral Efficiency (bps/Hz) | Code Rate | Modulation Scheme | Required SNR (dB) |
|---|---|---|---|---|
| 0 | 0.0 | — | — | — |
| 1 | 0.25 | 1/4 | BPSK | −1.8 |
| 2 | 0.5 | 1/2 | BPSK | 1.2 |
| 3 | 1.0 | 1/2 | QPSK | 4.2 |
| 4 | 1.5 | 3/4 | QPSK | 6.8 |
| 5 | 2.0 | 1/2 | 16 QAM | 10.1 |
| 6 | 2.5 | 5/8 | 16 QAM | 11.7 |
| 7 | 3.0 | 3/4 | 16 QAM | 13.2 |
| 8 | 3.5 | 7/12 | 64 QAM | 16.2 |
| 9 | 4.0 | 2/3 | 64 QAM | 17.4 |
| 10 | 4.5 | 3/4 | 64 QAM | 18.8 |
| 11 | 5.0 | 5/6 | 64 QAM | 20.0 |

TABLE 4-continued

| Rate Index | Spectral Efficiency (bps/Hz) | Code Rate | Modulation Scheme | Required SNR (dB) |
|---|---|---|---|---|
| 12 | 6.0 | 3/4 | 256 QAM | 24.2 |
| 13 | 7.0 | 7/8 | 256 QAM | 26.3 |

A look-up table may be used to store the set of supported rates and the required SNR for each supported rate. The SNR estimate for each data stream may be provided to the look-up table and compared against the required SNRs for the supported rates. The look-up table then provides a selected rate for each data stream, which is the supported rate with the highest throughput and a required SNR that is less than or equal to the SNR estimate for that data stream.

In another embodiment, the rates for the M data streams are selected with margin sharing. The rate for each data stream is initially selected based on the SNR estimate for that data stream, as described above. The SNR margin for each data stream is determined. The total SNR margin is then computed and distributed among the data streams so that one or more rates for one or more data streams may be increased.

In yet another embodiment, the rates for the M data streams are jointly selected based on the SNR estimates for these data streams. The system may support a vector-quantized rate set in which only certain combinations of rates are allowed. Each rate combination indicates a particular number of data streams to transmit and the rate to use for each data stream. A rate combination with the highest overall throughput may be selected based on the SNR estimates for the data streams.

The number of data streams to transmit (M) may also be selected based on the SNR estimates. In one embodiment, the overall throughput is computed for each of the possible numbers of data streams, e.g., for M=1, 2, ..., S. For each value of M, the total transmit power is distributed (e.g., uniformly) across M data streams, the received SNRs are computed for each data stream based on the allocated transmit power, the SNR estimate is derived for each data stream and used to select the rate for that data stream, and the overall throughput is computed as the sum of the selected data rates for the M data streams. The largest overall throughput among the S overall throughputs computed for the S different possible numbers of data streams is determined, and the number of data streams that provides this largest overall throughput is selected as M.

For the spatial spreading mode, the optimum number of data streams is rarely equal to the number of spatial channels. Transmitting S data streams simultaneously typically results in excessive crosstalk. Hence, the overall throughput achievable with S data streams is often lower than the overall throughput achievable with S−1 or fewer data streams. For the spatial spreading mode, M may be restricted to be M≦S−1.

Which transmission mode to use for data transmission may be selected based on the age of the steering vectors. If the steering vectors are recent enough, then the data streams transmitted with these steering vectors will be matched to the wireless channel, and the receiving station will receive orthogonal data streams. As the mismatch between the steering vectors and the wireless channel increases, the gain of eigensteering diminishes due to increased crosstalk among the data streams. Under these conditions, is may be more appropriate to use the spatial spreading mode for data transmission. The transmission mode may also be selected based on other factors such as, for example, the capabilities of the transmitting and receiving stations, the coherence time of the MIMO channel, the feedback delay, the type of data traffic to be served, and so on.

3. Outer Loop

In an embodiment, the ASYM parameter is fixed and the outer loop adjusts the outer loop back-off factor for each data stream to achieve the target PER for that data stream. The outer loop back-off factor may be independently maintained for each data stream if packets for each data stream are encoded separately and the feedback is per packet or per burst. The outer loop back-off factor for each data stream m may be updated as follows:

$$\gamma_{outer,m}(n) = \begin{cases} \gamma_{outer,m}(n-1) + \delta_m & \text{for erased packet,} \\ \max\{C, \gamma_{outer,m}(n-1) - P_m \cdot \delta_m\} & \text{for good packet,} \end{cases} \quad \text{Eq (22)}$$

where $\delta_m$ is a step size of the outer loop back-off factor for an erased packet;

$P_m$ is the fraction of $\delta_m$ to be subtracted for a good packet; and $\gamma_{outer,m}(n)$ is the outer loop back-off factor for packet n in data stream m.

C is a constant value that is typically positive but may also be negative.

The step size $\delta_m$ determines the rate of convergence for the outer loop. The outer loop back-off factor may be initialized at the start of data transmission to a predetermined value (e.g., to zero or some other) and may thereafter be updated based on the status of the received packets based on the ACK/NAK.

The factor $P_m$ determines the packet error rate for data stream m and may be expressed as:

$$P_m = \frac{PER_m}{1 - PER_m}, \quad \text{Eq (23)}$$

where $PER_m$ is the target PER for data stream m. For example, if $PER_m=0.01$ for 1% PER, then $P_m=0.0101=1/99$.

For jointly encoded data streams, a single packet may be encoded, partitioned, and sent across these data streams. In this case, it may be difficult to determine which one of the data streams caused a packet error. An SNR margin may be maintained for each data stream. The SNR margin for data stream m is computed as the difference between the required SNR for the selected rate and the SNR estimate for that data stream. For each erased packet, the data stream with the smallest SNR margin may be assumed to have caused the packet error, and the outer loop back-factor for this data stream may be increased. For each good packet, the outer loop back-factors for all data streams may be decreased. If all data streams have nearly identical SNR margins, which is typically the case for the spatial spreading mode, then a single outer loop back-off factor may be maintained for all data streams.

In another embodiment, the outer loop adjusts the ASYM parameter based on the ACKs to achieve the target PER. The ASYM parameter may be updated as follows:

$$ASYM(n) = \begin{cases} ASYM(n) + \Delta_{ASYM} & \text{for erased packet,} \\ ASYM(n) - \Delta_{ASYM} \cdot P_m & \text{for good packet,} \end{cases} \quad \text{Eq (24)}$$

where $\epsilon_{ASYM}$ is a step size for the ASYM parameter for an erased packet.

The description above is for a specific embodiment of the inner and outer loops. For this embodiment, the inner loop selects the transmission mode, the number of data streams, and the rate for each data stream based on the received SNRs and other parameters. The outer loop adjusts one or more of the parameters based on ACK feedback. Rate selection and rate control may also be performed in other manners. For example, the outer loop may direct the inner loop to reduce or increase the number of data streams, adjust one or more rates for one or more data stream, and so on.

In another embodiment of the inner and outer loops, transmitting station A transmits a single data stream at a rate that may be selected based on the ASYM parameter as described above. Station A determines the SNR margin for the data stream and selects the next higher rate for the data stream if the SNR margin is positive and the most recent packet transmission(s) are successful. Station A enables an additional stream once the highest rate has been reached for the current data streams. When enabling the additional data stream, the overall throughput is limited to X times (e.g., X≈1.3) higher than the prior overall throughput and is distributed (e.g., evenly) among the enabled data streams. Station A may select the next higher rate for one or both data streams if the SNR margin continues to be positive and packet transmissions continue to be successful. Additional data streams may be enabled in similar manner. If an erased packet is encountered (e.g., an ACK is not received), then station A may (1) reduce the rate for one or more data streams or select the last known good rate combination and/or (2) reduce the number of data streams. For example, station A may reduce the rate if the received SNR is relatively static and may reduce the number of data streams if the received SNR has changed abruptly. Station A may also drop the overall rate by some percentage (e.g., by 50%) if the rate and/or stream reduction still result in packet errors.

Other designs for the inner and outer loops may also be implemented, and this is within the scope of the disclosure.

A system typically includes multiple access points and multiple user terminals. Each access point may periodically transmit pilot (or a beacon) and other signaling. A user terminal may search for pilots from the access points and may access and register with each access point whose pilot was received with sufficient strength. Pertinent information may be exchanged during registration to enable both the user terminal and the access point to determine the ASYM parameters for their links.

For uplink data transmission from the user terminal to the access point, the user terminal may derive SNR estimates for the downlink based on the pilot transmitted periodically by the access point and/or the last downlink transmission to the user terminal. The user terminal may then derive SNR estimates for the uplink based on the downlink SNR estimates and the ASYM parameter and may select one or more rates for uplink transmission based on the uplink SNR estimates.

For downlink data transmission from the access point to the user terminal, the access point may not receive any transmission from the user terminal and may not be able to derive uplink SNR estimates. In this case, the access point may start with a single data stream and may use a predetermined rate. In an embodiment, this rate may be a medium rate (e.g., 24 Mbps for IEEE 802.11a), the last known good rate for the user terminal, the highest rate, or some other rate. If control frames are exchanged prior to data transmission, then the access point may initially transmit a control frame at the predetermined rate and/or using the rates required for transmission of control frames (e.g., one of the basic rates 6 Mbps or 12 Mbps or 24 Mbps for IEEE 802.11a) and may progressively reduce the rate until the control frame is received correctly. The rate for data transmission may then be selected based on rate for the control frame and/or information obtained from a control response frame.

The rate control techniques described herein may be implemented by various means. For example, these techniques may be implemented in hardware, software, or a combination thereof. For a hardware implementation, the processing units used to perform rate control at a transmitting station (e.g., channel estimator 332, rate selector 334, rate adjustment unit 338, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof, each of which may be coupled as appropriate in one or more devices. The processing units used to support rate control at a receiving station may also be implemented within one or more ASICs, DSPs, processors, and so on.

For a software implementation, the rate control techniques may be implemented with modules (e.g., procedures, functions, and so on) that perform the functions described herein. The software codes may be stored in a memory unit (e.g., memory unit 342 in FIG. 3) and executed by a processor (e.g., controller 340 in FIG. 3). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus comprising:
a processor operative to estimate channel quality of a first communication link based on a transmission received via the first communication link; and
a controller operative to estimate channel quality of a second communication link based on the estimated channel quality of the first communication link and an asymmetric parameter indicative of a difference between a signal-to-noise-and-interference ratio (SNR) for the first communication link and an SNR for the second communication link and to select at least one rate for a data transmission via the second communication link based on the estimated channel quality of the second communication link, wherein the controller is operative to receive feedback for packets sent in the data transmission and to adjust the asymmetric parameter based on the received feedback, wherein the feedback comprises at least one of an acknowledgment (ACK) and a negative acknowledgment (NAK).

2. The apparatus of claim 1, wherein the processor is operative to derive a signal-to-noise-and-interference ratio (SNR) estimate for a first transmission channel on the first communication link based on the transmission received via the first communication link, and wherein the controller is operative to derive an SNR estimate for a second transmission channel on the second communication link based on the SNR estimate for the first transmission channel and the asymmetric parameter and to select a rate for the second transmission channel based on the SNR estimate for the second transmission channel.

3. The apparatus of claim 2, wherein the processor is operative to determine at least one received SNR for at least one frequency subband of the first transmission channel and to derive the SNR estimate for the first transmission channel based on the at least one received SNR.

4. The apparatus of claim 1, wherein the controller is operative to select the at least one rate further based on a back-off factor.

5. The apparatus of claim 4, wherein the controller is operative to adjust the back-off factor based on the received feedback.

6. The apparatus of claim 2, wherein the processor is operative to derive the SNR estimate for the first transmission channel further based on a diversity order for the first transmission channel.

7. The apparatus of claim 2, wherein the processor is operative to derive the SNR estimate for the first transmission channel further based on a factor that accounts for variability in the at least one received SNR.

8. The apparatus of claim 2, wherein the processor is operative to determine the at least one received SNR based on a receiver spatial processing technique used by a receiving station for the data transmission.

9. The apparatus of claim 1, wherein the controller is operative to determine the asymmetric parameter based on capabilities of a transmitting station and capabilities of a receiving station for the data transmission.

10. The apparatus of claim 9, wherein the capabilities of each of the transmitting and receiving stations comprise peak transmit power, receiver noise figure, and number of receive antennas.

11. The apparatus of claim 1, wherein the controller is operative to determine the asymmetric parameter based on a received SNR for the first communication link and a received SNR for the second communication link.

12. The apparatus of claim 1, wherein the controller is operative to adjust the asymmetric parameter based on performance of the data transmission.

13. The apparatus of claim 1, wherein the controller is operative to adjust the at least one rate, to vary a number of data streams, or both based on performance of the data transmission.

14. A method of performing rate selection, comprising:
estimating channel quality of a first communication link based on a transmission received via the first communication link;
estimating channel quality of a second communication link based on the estimated channel quality of the first communication link and an asymmetric parameter indicative of a difference between a signal-to-noise-and-interference ratio (SNR) for the first communication link and an SNR for the second communication link;

selecting at least one rate for a data transmission via the second communication link based on the estimated channel quality of the second communication link;

receiving feedback for packets sent in the data transmission; and adjusting the asymmetric parameter based on the received feedback, wherein the feedback comprises at least one of an acknowledgment (ACK) and a negative acknowledgment (NAK).

15. The method of claim 14, wherein the estimating the channel quality of the first communication link comprises deriving a signal-to-noise-and-interference ratio (SNR) estimate for a first transmission channel on the first communication link based on the transmission received via the first communication link, the estimating the channel quality of the second communication link comprises deriving an SNR estimate for a second transmission channel on the second communication link based on the SNR estimate for the first transmission channel and the asymmetric parameter, and the selecting the at least one rate comprises selecting a rate for the second transmission channel based on the SNR estimate for the second transmission channel.

16. The method of claim 14, further comprising:
determining the asymmetric parameter based on capabilities of a transmitting station and capabilities of a receiving station for the data transmission.

17. The method of claim 14, further comprising:
determining the asymmetric parameter based on a received signal-to-noise-and-interference ratio (SNR) for the first communication link and a received SNR for the second communication link.

18. The method of claim 14, further comprising:
adjusting the asymmetric parameter based on performance of the data transmission.

19. The method of claim 14, further comprising:
adjusting a back-off factor based on performance of the data transmission, and wherein the at least one rate is further selected based on the back-off factor.

20. An apparatus comprising:
means for estimating channel quality of a first communication link based on a transmission received via the first communication link; and means for estimating channel quality of a second communication link based on the estimated channel quality of the first communication link and an asymmetric parameter indicative of a difference between a signal-to-noise-and-interference ratio (SNR) for the first communication link and an SNR for the second communication link;

means for selecting at least one rate for a data transmission via the second communication link based on the estimated channel quality of the second communication link;

means for receiving feedback for packets sent in the data transmission; and means for adjusting the asymmetric parameter based on the received feedback, wherein the feedback comprises at least one of an acknowledgment (ACK) and a negative acknowledgment (NAK).

21. The apparatus of claim 20, wherein the means for estimating the channel quality of the first communication link comprises means for deriving a signal-to-noise-and-interference ratio (SNR) estimate for a first transmission channel on the first communication link based on the transmission received via the first communication link, the means for estimating the channel quality of the second communication link comprises means for deriving an SNR estimate for a second transmission channel on the second communication link based on the SNR estimate for the first transmission channel and the asymmetric parameter, and the means for selecting the at least one rate comprises means for selecting a rate for the second transmission channel based on the SNR estimate for the second transmission channel.

22. The apparatus of claim 20, further comprising: means for determining the asymmetric parameter based on capabilities of a transmitting station and capabilities of a receiving station for the data transmission.

23. The apparatus of claim 20, further comprising: means for determining the asymmetric parameter based on a received signal-to-noise-and-interference ratio (SNR) for the first communication link and a received SNR for the second communication link.

24. The apparatus of claim 20, further comprising: means for adjusting the asymmetric parameter based on performance of the data transmission.

25. The apparatus of claim 20, further comprising: means for adjusting a back-off factor based on performance of the data transmission, and wherein the at least one rate is further selected based on the back-off factor.

26. An apparatus comprising:
a processor operative to derive a first plurality of signal-to-noise-and-interference ratio (SNR) estimates for a first plurality of transmission channels on a first communication link based on a transmission received via the first communication link; and a controller operative to derive a second plurality of SNR estimates for a second plurality of transmission channels on a second communication link based on the first plurality of SNR estimates and an asymmetric parameter and to select a plurality of rates for the second plurality of transmission channels based on the second plurality of SNR estimates, wherein the asymmetric parameter is indicative of a difference between an SNR for the first communication link and an SNR for the second communication link, wherein the controller is operative to receive feedback for packets sent in a data transmission using at least one of the plurality of rates and to adjust the asymmetric parameter based on the received feedback, wherein the feedback comprises at least one of an acknowledgment (ACK) and a negative acknowledgment (NAK).

27. The apparatus of claim 26, wherein the processor is operative to determine received SNRs for a plurality of frequency subbands of each of the first plurality of transmission channels and to derive an SNR estimate for each of the first plurality of transmission channels based on the received SNRs.

28. The apparatus of claim 27, wherein the processor is operative to determine the received SNRs for each of the first plurality of transmission channels based on a receiver processing technique used by a receiving station for a data transmission on the second plurality of transmission channels.

29. The apparatus of claim 26, further comprising:
a second processor operative to encode and modulate a plurality of data streams based on the plurality of rates.

30. The apparatus of claim 26, further comprising:
a second processor operative to spatially process a plurality of data streams for a steered mode, an unsteered mode, or a spatial spreading mode.

31. The apparatus of claim 26, wherein the second plurality of transmission channels are a plurality of spatial channels of a multiple-input multiple-output (MIMO) channel.

32. The apparatus of claim 26, wherein the second plurality of transmission channels are a plurality of eigenmodes of a multiple-input multiple-output (MIMO) channel.

33. A method comprising:
deriving a first plurality of signal-to-noise-and-interference ratio (SNR) estimates for a first plurality of transmission channels on a first communication link based on a transmission received via the first communication link;
deriving a second plurality of SNR estimates for a second plurality of transmission channels on a second communication link based on the first plurality of SNR estimates and an asymmetric parameter, wherein the asymmetric parameter is indicative of a difference between an SNR for the first communication link and an SNR for the second communication link;
selecting a plurality of rates for the second plurality of transmission channels based on the second plurality of SNR estimates;
receiving feedback for packets sent in a data transmission using at least one of the plurality of rates; and
adjusting the asymmetric parameter based on the received feedback,
wherein the feedback comprises at least one of an acknowledgment (ACK) and a negative acknowledgment (NAK).

34. The method of claim 33, wherein the deriving the first plurality of SNR estimates comprises
determining received SNRs for a plurality of frequency subbands of each of the first plurality of transmission channels; and
deriving an SNR estimate for each of the first plurality of transmission channels based on the received SNRs.

35. The method of claim 33, further comprising:
spatially processing a plurality of data streams for a steered mode, an unsteered mode, or a spatial spreading mode.

36. An apparatus comprising:
means for deriving a first plurality of signal-to-noise-and-interference ratio (SNR) estimates for a first plurality of transmission channels on a first communication link based on a transmission received via the first communication link;
means for deriving a second plurality of SNR estimates for a second plurality of transmission channels on a second communication link based on the first plurality of SNR estimates and an asymmetric parameter, wherein the asymmetric parameter is indicative of a difference between an SNR for the first communication link and an SNR for the second communication link;
means for selecting a plurality of rates for the second plurality of transmission channels based on the second plurality of SNR estimates;
means for receiving feedback for packets sent in a data transmission using at least one of the plurality of rates; and
means for adjusting the asymmetric parameter based on the received feedback,
wherein the feedback comprises at least one of an acknowledgment (ACK) and a negative acknowledgment (NAK).

37. The apparatus of claim 36, wherein the means for deriving the first plurality of SNR estimates comprises
means for determining received SNRs for a plurality of frequency subbands of each of the first plurality of transmission channels, and
means for deriving an SNR estimate for each of the first plurality of transmission channels based on the received SNRs.

38. The apparatus of claim 36, further comprising:
means for encoding and modulating a plurality of data streams based on the plurality of rates.

39. The apparatus of claim 36, further comprising:
means for spatially processing a plurality of data streams for a steered mode, an unsteered mode, or a spatial spreading mode.

40. An apparatus comprising:
a processor operative to derive at least one signal-to-noise-and-interference ratio (SNR) estimate for a first communication link based on a transmission received via the first communication link; and
a controller operative to derive at least one SNR estimate for a second communication link based on the at least one SNR estimate for the first communication link and an asymmetric parameter, to enable at least one data stream, to select at least one rate for the at least one data stream based on the at least one SNR estimate for the second communication link, and to adjust transmission of the at least one data stream based on feedback received for packets in the at least one data stream, wherein the asymmetric parameter is indicative of a difference between an SNR for the first communication link and an SNR for the second communication link, wherein the feedback comprises at least one of an acknowledgment (ACK) and a negative acknowledgment (NAK).

41. The apparatus of claim 40, wherein the controller is further operative to determine at least one SNR margin for the at least one data stream and to adjust the transmission of the at least one data stream further based on the at least one SNR margin.

42. The apparatus of claim 40, wherein the controller is operative to initially enable a single data stream and to select a rate for the single data stream based on an SNR estimate for the second communication link and an asymmetric parameter.

43. The apparatus of claim 42, wherein the controller is operative to increase the rate for the single data stream if packets in the single data stream are decoded correctly.

44. The apparatus of claim 40, wherein the controller is operative to enable an additional data stream if packets in the at least one enabled data stream are decoded correctly and the additional data stream is deemed to be sustainable.

45. The apparatus of claim 44, wherein the controller is operative to evenly distribute overall throughput among all enabled data streams when the additional data stream is enabled.

46. The apparatus of claim 44, wherein the controller is operative to increase overall throughput for all enabled data streams by up to a predetermined percentage when the additional data stream is enabled.

47. The apparatus of claim 40, wherein the controller is operative to disable an enabled data stream if a packet in any one of the at least one enabled data stream is decoded in error.

48. The apparatus of claim 40, wherein the controller is operative to reduce a rate for an enabled data stream if a packet in the enabled data stream is decoded in error.

49. A method of transmitting data, comprising:
deriving at least one signal-to-noise-and-interference ratio (SNR) estimate for a first communication link based on a transmission received via the first communication link;
deriving at least one SNR estimate for a second communication link based on the at least one SNR estimate for the first communication link and an asymmetric parameter, wherein the asymmetric parameter is indicative of a difference between an SNR for the first communication link and an SNR for the second communication link;
enabling at least one data stream;
selecting at least one rate for the at least one data stream based on the at least one SNR estimate for the second communication link; and
adjusting transmission of the at least one data stream based on feedback received for packets in the at least one data stream,
wherein the feedback comprises at least one of an acknowledgment (ACK) and a negative acknowledgment (NAK).

50. The method of claim 49, further comprising:
determining at least one SNR margin for the at least one data stream, and wherein the transmission of the at least one data stream is adjusted further based on the at least one SNR margin.

51. The method of claim 49, further comprising:
enabling an additional data stream if packets in the at least one enabled data stream are decoded correctly and the additional data stream is deemed to be sustainable.

52. The method of claim 49, further comprising:
disabling an enabled data stream if a packet in any one of the at least one enabled data stream is decoded in error.

53. The method of claim 49, further comprising:
reducing a rate for an enabled data stream if a packet in the enabled data stream is decoded in error.

54. An apparatus comprising:
means for deriving at least one signal-to-noise-and-interference ratio (SNR) estimate for a first communication link based on a transmission received via the first communication link;
means for deriving at least one SNR estimate for a second communication link based on the at least one SNR estimate for the first communication link and an asymmetric parameter, wherein the asymmetric parameter is indicative of a difference between an SNR for the first communication link and an SNR for the second communication link;
means for enabling at least one data stream;
means for selecting at least one rate for the at least one data stream based on the at least one SNR estimate for the second communication link; and
means for adjusting transmission of the at least one data stream based on feedback received for packets in the at least one data stream,
wherein the feedback comprises at least one of an acknowledgment (ACK) and a negative acknowledgment (NAK).

55. The apparatus of claim 54, further comprising:
means for determining at least one SNR margin for the at least one data stream, and wherein the transmission of the at least one data stream is adjusted further based on the at least one SNR margin.

56. An apparatus comprising:
a first processor operative to determine received signal-to-noise-and-interference ratios (SNRs) for a first plurality of subbands of a first transmission channel on a first communication link based on a pilot transmission received via the first communication link;
a controller operative to select at least one subband among a second plurality of subbands of a second transmission channel on a second communication link based on the received SNRs for the first transmission channel; and
a second processor operative to process data for transmission on the at least one subband of the second transmission channel.

57. The apparatus of claim 56, wherein the controller is operative to select each subband among the first plurality of subbands having a received SNR exceeding an SNR threshold, and wherein the at least one subband selected for the second transmission channel corresponds to at least one subband selected for the first transmission channel.

58. The apparatus of claim 56, wherein the controller is operative to allocate transmit power uniformly among the at least one subband.

59. The apparatus of claim 56, wherein the controller is operative to allocate transmit power among the at least one subband to achieve similar received SNRs for the at least one subband.

60. The apparatus of claim 56, wherein the controller is operative to allocate transmit power among the at least one subband such that a received SNR for each of the at least one subband is within a predetermined range of SNRs.

61. A method of transmitting data, comprising:
determining received signal-to-noise-and-interference ratios (SNRs) for a first plurality of subbands of a first transmission channel on a first communication link based on a pilot transmission received via the first communication link;
selecting at least one subband among a second plurality of subbands of a second transmission channel on a second communication link based on the received SNRs for the first transmission channel; and
processing data for transmission on the at least one subband of the second transmission channel.

62. The method of claim 61, wherein the selecting the at least one subband among the second plurality of subbands comprises
selecting each subband among the first plurality of subbands having a received SNR exceeding an SNR threshold, and wherein the at least one subband selected for the second transmission channel corresponds to at least one subband selected for the first transmission channel.

63. The method of claim 61, further comprising:
allocating transmit power for the second transmission channel among the at least one subband.

64. A computer program apparatus comprising a memory unit with software codes stored therein, the software codes executable by a processor for:
estimating channel quality of a first communication link based on a transmission received via the first communication link;
estimating channel quality of a second communication link based on the estimated channel quality of the first communication link and an asymmetric parameter indicative of a difference between a signal-to-noise-and-interference ratio (SNR) for the first communication link and an SNR for the second communication link;
selecting at least one rate for a data transmission via the second communication link based on the estimated channel quality of the second communication link;
receiving feedback for packets sent in the data transmission; and adjusting the asymmetric parameter based on the received feedback, wherein the feedback comprises at least one of an acknowledgment (ACK) and a negative acknowledgment (NAK).

65. The computer program apparatus of claim 64, wherein the estimating the channel quality of the first communication link comprises deriving a signal-to-noise-and-interference ratio (SNR) estimate for a first transmission channel on the first communication link based on the transmission received via the first communication link, the estimating the channel quality of the second communication link comprises deriving an SNR estimate for a second transmission channel on the second communication link based on the SNR estimate for the first transmission channel and the asymmetric parameter, and the selecting the at least one rate comprises selecting a rate for the second transmission channel based on the SNR estimate for the second transmission channel.

66. The computer program apparatus of claim 64, further comprising:

determining the asymmetric parameter based on capabilities of a transmitting station and capabilities of a receiving station for the data transmission.

67. The computer program apparatus of claim 64, further comprising:

determining the asymmetric parameter based on a received signal-to-noise-and-interference ratio (SNR) for the first communication link and a received SNR for the second communication link.

68. The computer program apparatus of claim 64, further comprising:

adjusting the asymmetric parameter based on performance of the data transmission.

69. The computer program apparatus of claim 64, further comprising:

adjusting a back-off factor based on performance of the data transmission, and wherein the at least one rate is further selected based on the back-off factor.

70. A computer program apparatus comprising a memory unit with software codes stored therein, the software codes executable by a processor for:

deriving a first plurality of signal-to-noise-and-interference ratio (SNR) estimates for a first plurality of transmission channels on a first communication link based on a transmission received via the first communication link;

deriving a second plurality of SNR estimates for a second plurality of transmission channels on a second communication link based on the first plurality of SNR estimates and an asymmetric parameter, wherein the asymmetric parameter is indicative of a difference between an SNR for the first communication link and an SNR for the second communication link;

selecting a plurality of rates for the second plurality of transmission channels based on the second plurality of SNR estimates;

receiving feedback for packets sent in a data transmission using at least one of the plurality of rates; and adjusting the asymmetric parameter based on the received feedback, wherein the feedback comprises at least one of an acknowledgment (ACK) and a negative acknowledgment (NAK).

71. The computer program apparatus of claim 70, wherein the deriving the first plurality of SNR estimates comprises determining received SNRs for a plurality of frequency subbands of each of the first plurality of transmission channels; and deriving an SNR estimate for each of the first plurality of transmission channels based on the received SNRs.

72. The computer program apparatus of claim 70, further comprising:

spatially processing a plurality of data streams for a steered mode, an unsteered mode, or a spatial spreading mode.

73. A computer program apparatus comprising a memory unit with software codes stored therein, the software codes executable by a processor for:

deriving at least one signal-to-noise-and-interference ratio (SNR) estimate for a first communication link based on a transmission received via the first communication link;

deriving at least one SNR estimate for a second communication link based on the at least one SNR estimate for the first communication link and an asymmetric parameter, wherein the asymmetric parameter is indicative of a difference between an SNR for the first communication link and an SNR for the second communication link;

enabling at least one data stream;

selecting at least one rate for the at least one data stream based on the at least one SNR estimate for the second communication link; and adjusting transmission of the at least one data stream based on feedback received for packets in the at least one data stream, wherein the feedback comprises at least one of an acknowledgment (ACK) and a negative acknowledgment (NAK).

74. The computer program apparatus of claim 73, further comprising:

determining at least one SNR margin for the at least one data stream, and wherein the transmission of the at least one data stream is adjusted further based on the at least one SNR margin.

75. The computer program apparatus of claim 73, further comprising:

enabling an additional data stream if packets in the at least one enabled data stream are decoded correctly and the additional data stream is deemed to be sustainable.

76. The computer program apparatus of claim 73, further comprising:

disabling an enabled data stream if a packet in any one of the at least one enabled data stream is decoded in error.

77. The computer program apparatus of claim 73, further comprising:

reducing a rate for an enabled data stream if a packet in the enabled data stream is decoded in error.

78. A computer program apparatus comprising a memory unit with software codes stored therein, the software codes executable by a processor for:

determining received signal-to-noise-and-interference ratios (SNRs) for a first plurality of subbands of a first transmission channel on a first communication link based on a pilot transmission received via the first communication link;

selecting at least one subband among a second plurality of subbands of a second transmission channel on a second communication link based on the received SNRs for the first transmission channel; and processing data for transmission on the at least one subband of the second transmission channel.

79. The computer program apparatus of claim 78, wherein the selecting the at least one subband among the second plurality of subbands comprises selecting each subband among the first plurality of subbands having a received SNR exceeding an SNR threshold, and wherein the at least one subband selected for the second transmission channel corresponds to at least one subband selected for the first transmission channel.

80. The computer program apparatus of claim 78, further comprising:

allocating transmit power for the second transmission channel among the at least one subband.

* * * * *